US010719791B2

(12) United States Patent
Goyal et al.

(10) Patent No.: US 10,719,791 B2
(45) Date of Patent: Jul. 21, 2020

(54) TOPIC-BASED PLACE OF INTEREST DISCOVERY FEED

(71) Applicant: Microsoft Technology Licensing, LLC, Redmond, WA (US)

(72) Inventors: Hemant Goyal, Redmond, WA (US); Benny Hartono, Bellevue, WA (US); Wensi Li, Sammamish, WA (US); Jeongwoo Choi, Bellevue, WA (US); Jessica Leigh May, Bellevue, WA (US); Chelsea Nicole Mitchell, Bellevue, WA (US); Dvir Horovitz, Redmond, WA (US); Rijuta Ajay Trivedi, Seattle, WA (US); Ryuichi Hirano, Renton, WA (US); Jyotkumar Jagdishbhai Patel, Bellevue, WA (US); Chia-Huei Yen, Mercer Island, WA (US); Daniel Chin Hua Lau, Bellevue, WA (US); Vimal R. Kocherla, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 15/721,543

(22) Filed: Sep. 29, 2017

(65) Prior Publication Data

US 2018/0349820 A1 Dec. 6, 2018

Related U.S. Application Data

(60) Provisional application No. 62/512,529, filed on May 30, 2017.

(51) Int. Cl.
*G06Q 10/06* (2012.01)
*G06F 16/95* (2019.01)
(Continued)

(52) U.S. Cl.
CPC ... *G06Q 10/06311* (2013.01); *G06F 16/9537* (2019.01); *G06Q 10/02* (2013.01);
(Continued)

(58) Field of Classification Search
CPC .. G06Q 10/06311; G06Q 10/02; G06Q 50/01; G06Q 30/0269; G06Q 30/0255;
(Continued)

(56) References Cited

U.S. PATENT DOCUMENTS 9,519,722 B1  12/2016  Parikh et al.
2007/0179863 A1  8/2007  Stoll
(Continued)

FOREIGN PATENT DOCUMENTS

WO  2013041517 A1  3/2013

OTHER PUBLICATIONS

Wang, et al., "Location recommendation in location-based social networks using user check-in data", In Proceedings of the 21st ACM SIGSPATIAL International Conference on Advances in Geographic Information Systems, Nov. 5, 2013, pp. 364-373.
(Continued)

*Primary Examiner* — Rodney A Butler

(57) ABSTRACT

Generating an interactive discovery feed of place of interest items (POIs) relevant to a user is provided. A relevant POI discovery feed system curates a collection of narratives about various POIs from multiple sources and generates a plurality of POI content feed items including content items (e.g., photos, maps, links to additional information or related POIs) extracted from the collection of narratives. The system determines a set of POIs relevant to a user based on user-selected topics of interest and user preferences inferred from signals generated from user interactions with the system, and generates a discovery feed of POI content feed items associated with the set of relevant POIs for display to
(Continued)

the user. In some examples, the items are presented in a card-based UI. Users are enabled to easily discover new places, view photos, and learn more about POIs in a consistent presentation of POI-related content feed items.

20 Claims, 16 Drawing Sheets

(51) Int. Cl.
*G06Q 30/02* (2012.01)
*G06F 16/9537* (2019.01)
*G06Q 10/02* (2012.01)
*G06Q 50/00* (2012.01)
*G06Q 10/04* (2012.01)
*G06Q 50/14* (2012.01)

(52) U.S. Cl.
CPC ......... *G06Q 30/02* (2013.01); *G06Q 30/0255* (2013.01); *G06Q 30/0269* (2013.01); *G06Q 50/01* (2013.01); *G06Q 10/047* (2013.01); *G06Q 50/14* (2013.01)

(58) Field of Classification Search
CPC ...... G06Q 30/02; G06Q 10/047; G06Q 50/14; G06F 16/9537
See application file for complete search history.

(56) References Cited

U.S. PATENT DOCUMENTS

| | | |
|---|---|---|
| 2007/0185744 A1 | 8/2007 | Robertson |
| 2008/0077574 A1 | 3/2008 | Gross |
| 2010/0088608 A1 | 4/2010 | Schiller et al. |
| 2010/0312464 A1 | 12/2010 | Fitzgerald et al. |
| 2011/0276565 A1 | 11/2011 | Zheng et al. |
| 2013/0150086 A1 | 6/2013 | Caralis et al. |
| 2014/0214819 A1* | 7/2014 | Aitchison ............... G06F 16/29 707/724 |
| 2014/0229102 A1 | 8/2014 | Bapna et al. |
| 2015/0187107 A1* | 7/2015 | Vander Mey .......... G06Q 30/00 345/629 |
| 2015/0241225 A1* | 8/2015 | Liu .................... G01C 21/3682 701/540 |
| 2015/0262069 A1* | 9/2015 | Gabriel ............... G06F 16/9535 706/48 |
| 2016/0110433 A1* | 4/2016 | Sawhney ............ G06F 16/9535 707/722 |
| 2017/0048672 A1 | 2/2017 | Herz et al. |
| 2017/0060651 A1* | 3/2017 | Falter ...................... G06F 9/543 |

OTHER PUBLICATIONS

Umlauft, et al., "Lol@, A Mobile Tourist Guide for Umts", In Journal of Information Technology & Tourism, vol. 5, No. 3, Jan. 1, 2002, 2 pages.

Borras, Joan, "Intelligent Tourism Reconmender Systems: A Survey", In a Survey—Expert Systems with Applications, vol. 16, Issue 41, Apr. 2014, 20 Pages.

Damianos, Gavalas, "Mobile Recommender Systems in Tourism", In Journal—Network and Computer Applications, vol. 39, Mar. 1, 2014, 15 Pages.

"International Search Report and Written Opinion Issued in PCT Application No. PCT/US2018/029676", dated Jul. 3, 2018, 12 Pages.

* cited by examiner

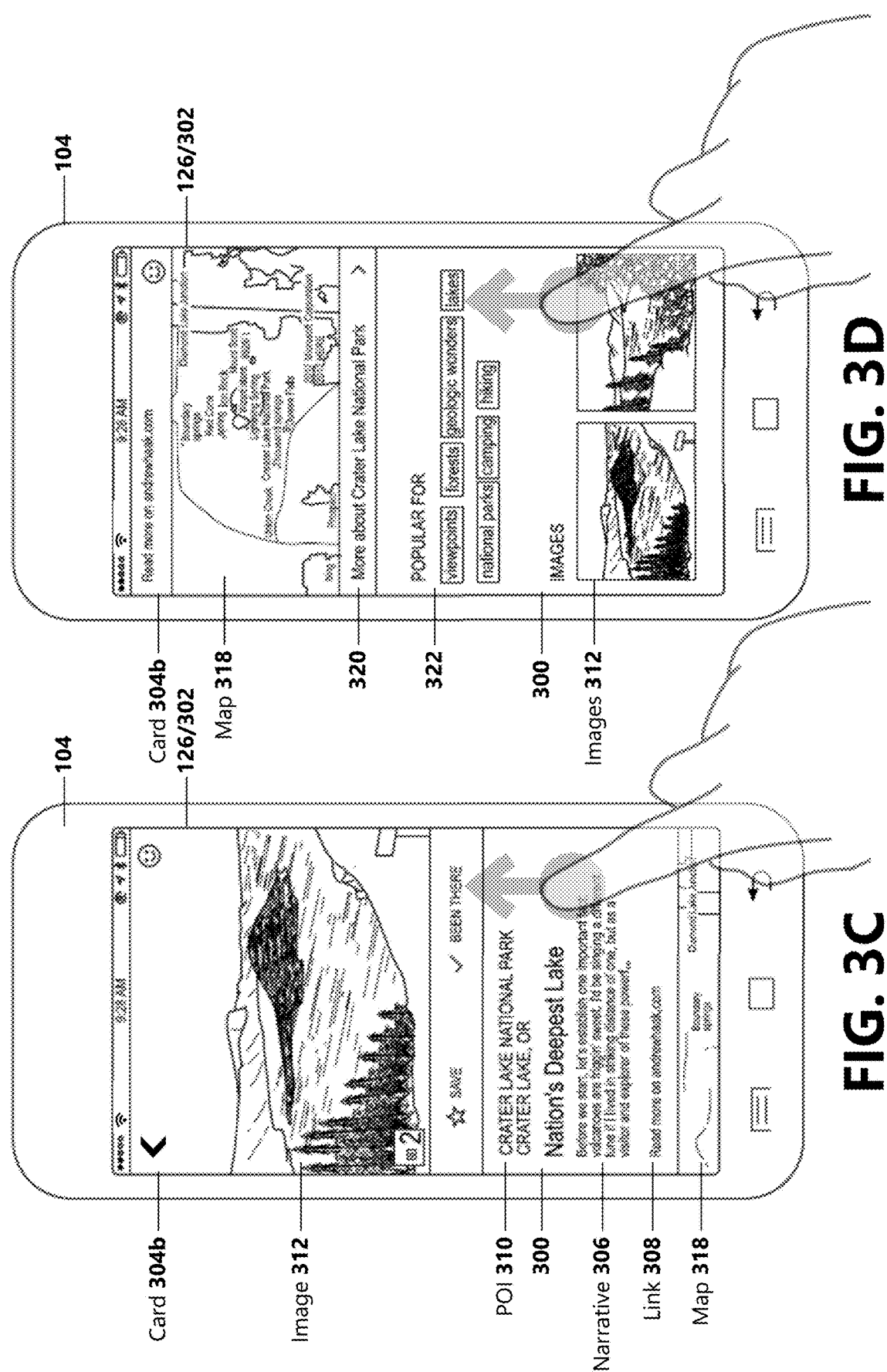

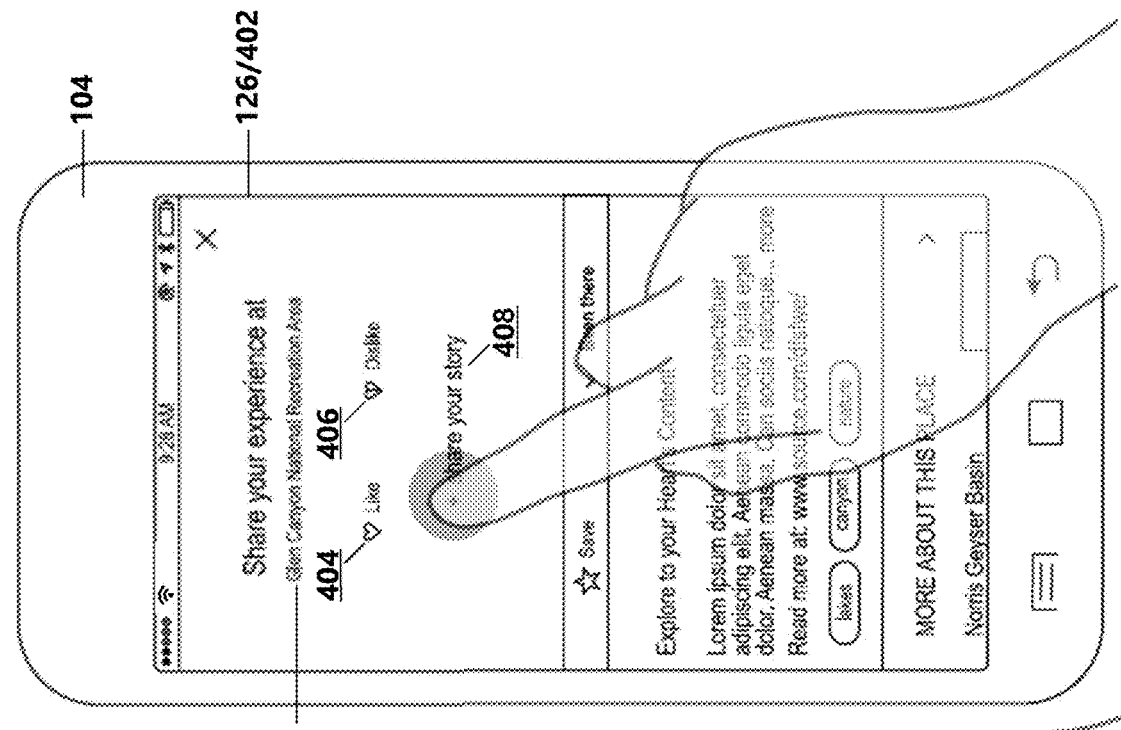
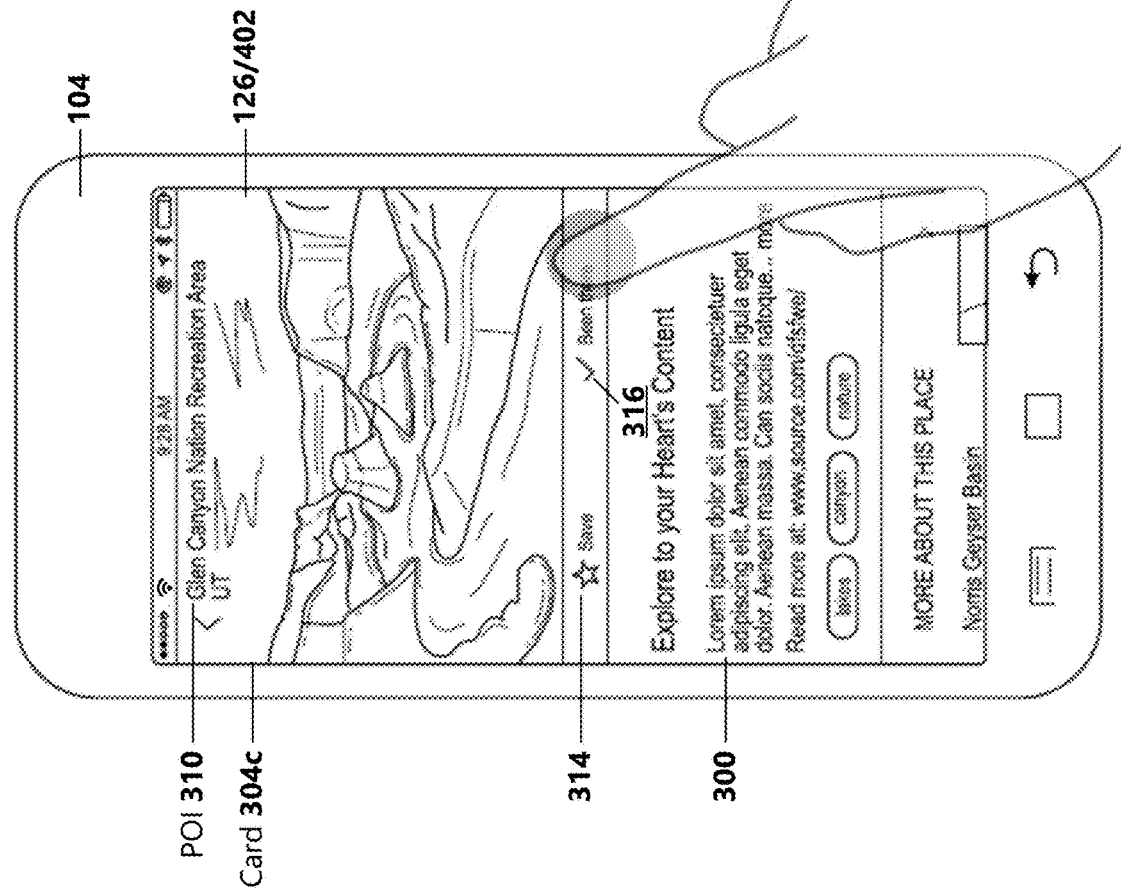
FIG. 4B
FIG. 4A

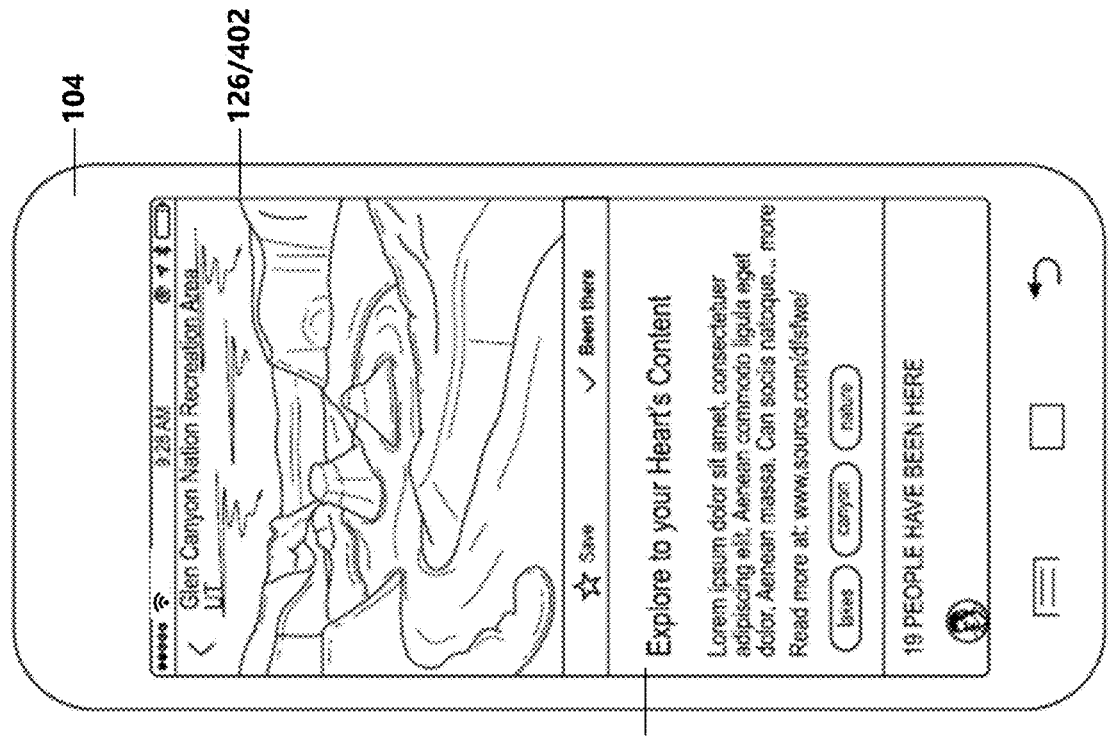
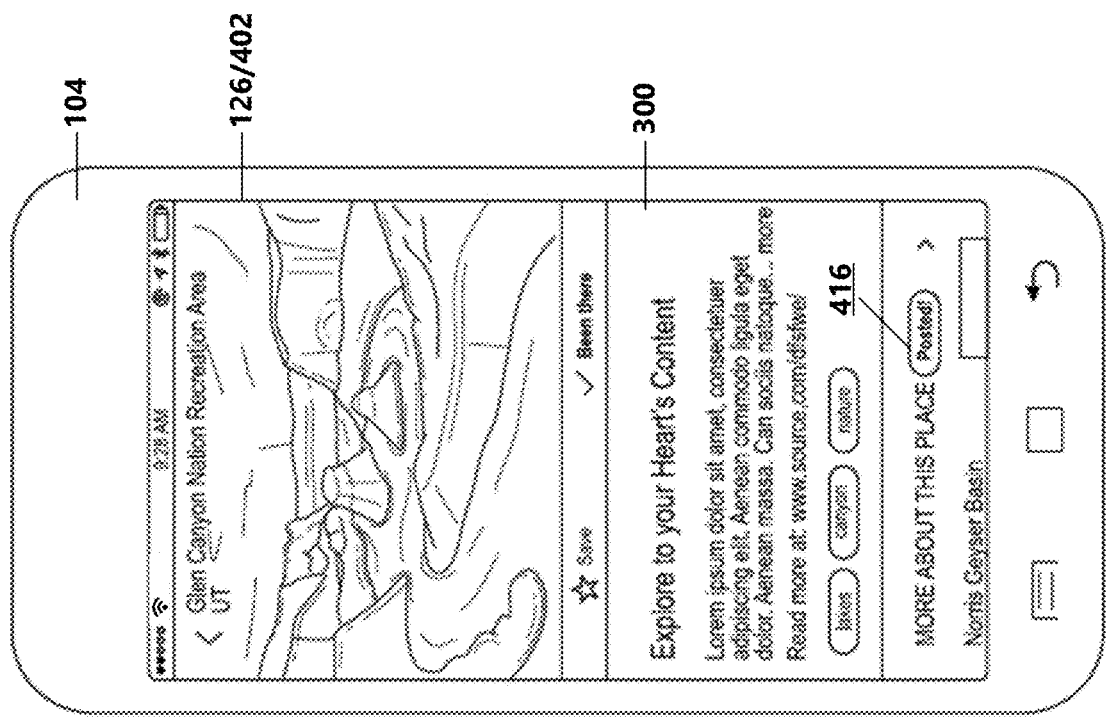
FIG. 4F
FIG. 4E

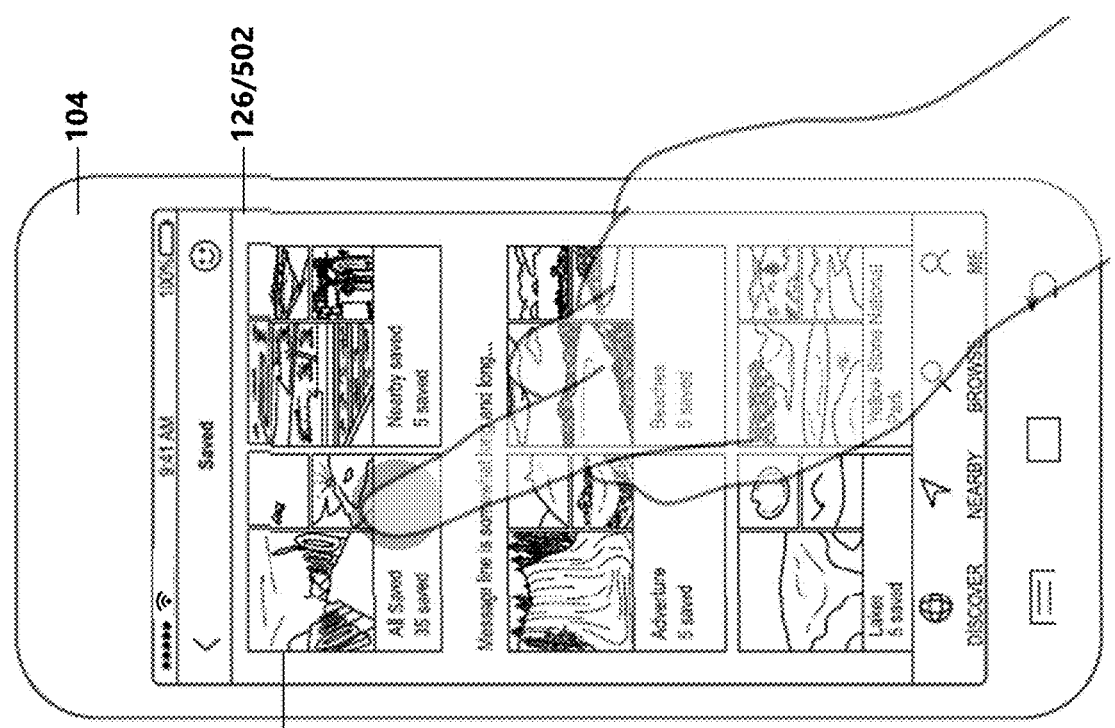
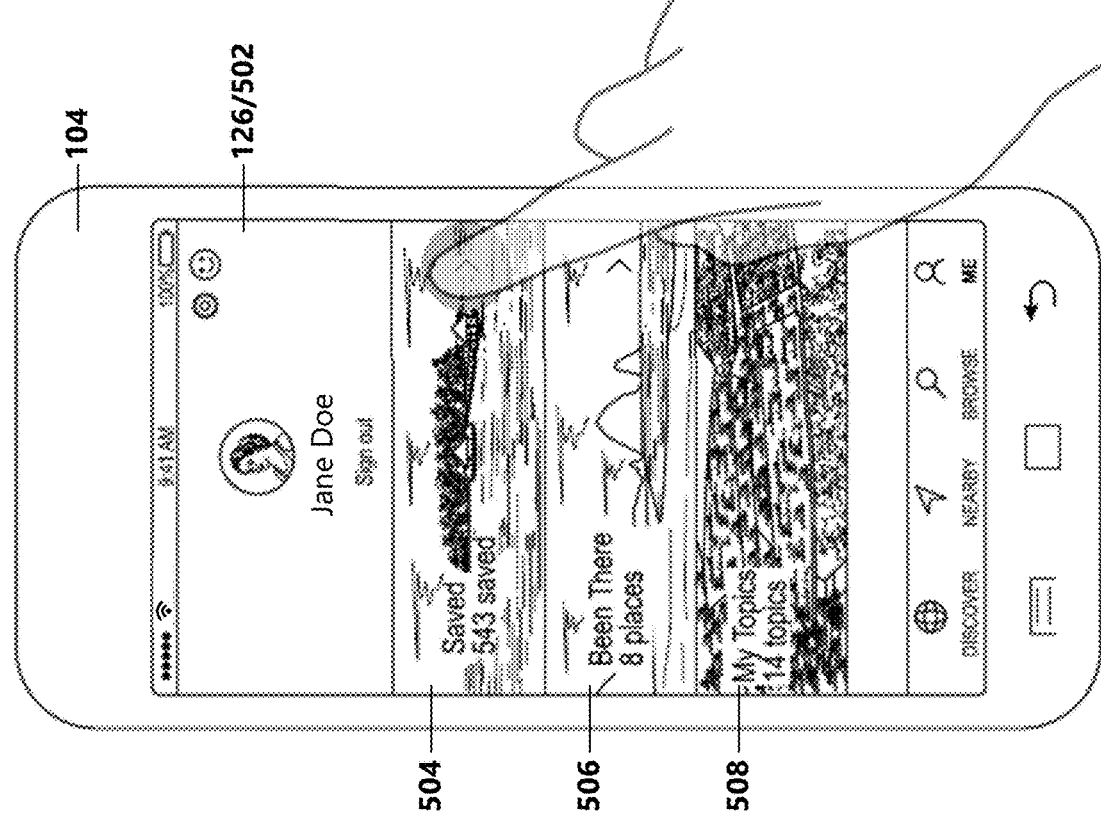
FIG. 5B
FIG. 5A

TOPIC-BASED PLACE OF INTEREST DISCOVERY FEED

CROSS REFERENCE TO RELATED APPLICATIONS

The present disclosure claims priority from U.S. Provisional Patent Application Ser. No. 62/512,529, having the title of "TOPIC-BASED PLACE OF INTEREST DISCOVERY FEED" and the filing date of May 30, 2017, which is incorporated herein by reference in its entirety.

BACKGROUND

Various applications exist that enable users to discover new places that they may like to visit. However, while some applications show top places to visit for a particular location, they are often limited to top places and do not surface lesser-known places of interest that tourists may not visit. Other applications may show scenic pictures for places of interest, but do not provide additional details. Additionally, while users can use search engines, they are not able to search for places of interest that they do not know about. Further, in the event that a search engine surfaces a place of interest that the user may be interested in visiting, it is likely to be buried in superfluous information that requires the user to spend extra time sifting through.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Aspects are directed to a method, system and computer readable storage device for generating an interactive discovery feed of place of interest items relevant to a user. For example, a relevant place of interest (POI) content feed system is provided for curating a collection of narratives or articles about various POIs from multiple sources and generating a plurality of POI content feed items including content items extracted from the collection of narratives. Further, the Relevant POI discovery feed system determines a set of POIs relevant to a particular user based on user-selected topics of interest and user preferences inferred from signals generated as the user interacts with the system, and generates an interactive discovery feed of POI content feed items associated with the set of relevant POIs for display to the user. In some examples, the POI content feed items selected for inclusion in the discovery feed are contextualized based on distance, season, or other factors. In various examples, the POI content feed items include photos, maps, or links to additional information or related POIs.

Accordingly, users are enabled to easily discover new places, view photos, and learn more about POIs in a consistent presentation of POI-related content feed items. For example, a user is able to view information associated with POIs relevant to him/her in a user interface wherein one POI content feed item is displayed in the user interface at a time, such that the user is not overloaded with information that the user has to sift through to find information relevant to him/her. In various examples, users are enabled to save POI content feed items associated with places they would like to visit, and to add comments to items associated with places they have visited. Accordingly, aspects of the relevant POI discovery feed system provide an improved user experience and improved user interaction efficiency.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings:

FIGS. 3A-E illustrate example user interfaces generated by aspects of the relevant POI discovery feed system where a user is presented with an interactive discovery feed of relevant POI content feed items;

FIGS. 4A-F illustrate example user interfaces generated by aspects of the relevant POI discovery feed system where a user is enabled to provide user input related to a POI;

FIGS. 5A-C illustrate example user interfaces generated by aspects of the relevant POI discovery feed system where POI content feed items are categorized;

DETAILED DESCRIPTION

Figure 1:
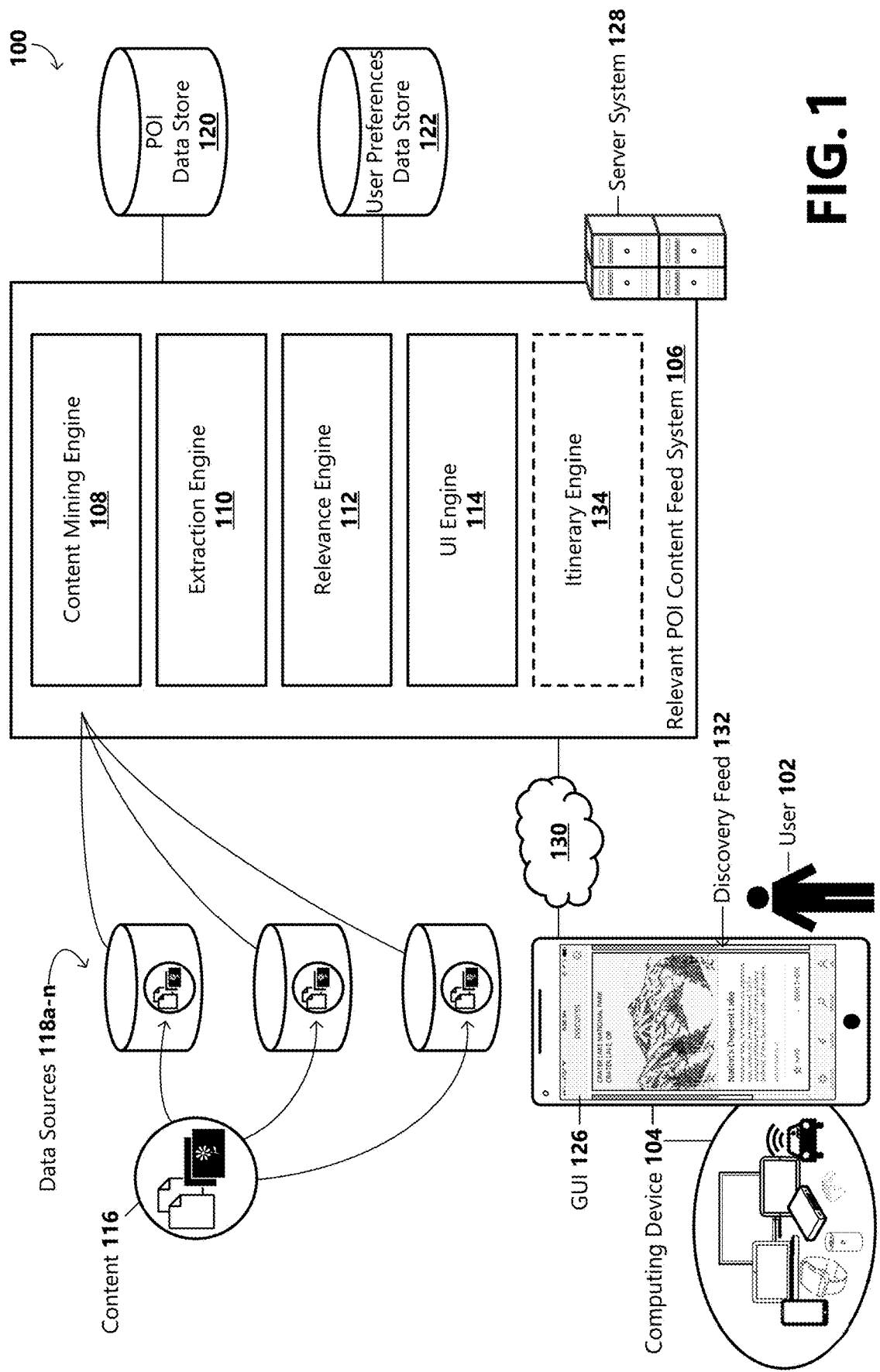
FIG. 1 is a block diagram illustrating an example environment in which a relevant place of interest (POI) discovery feed system can be implemented for surfacing POI content feed items relevant to a user.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system and computer readable storage device for generating an interactive discovery feed of content items related to places of interest relevant to a user. A relevant place of interest (POI) content feed system generates a collection of POI content feed items including POI-related narratives or articles it curates from multiple sources, and displays them to users based on their individual interests. The relevant POI discovery feed system includes a relevance engine that determines what POI content feed items to include in a personalized feed for a particular user based on the user's interests and signals the user provides to the system. In various examples, the POI content feed items include a narrative or article and are augmented with photos, maps, or links to additional information or related POIs. Accordingly, users are enabled to easily discover new places, view photos, and learn more about a POI in one location. In various examples, users are enabled to save POI content feed items associated with places they would like to visit, and to add comments to POI content feed items associated with places they have visited.

FIG. 1 illustrates a block diagram of a representation of a computing environment 100 in which aspects may be implemented. As illustrated, the example environment 100 includes a relevant POI discovery feed system 106, operative or configured to generate an interactive discovery feed of POI content feed items related to POIs relevant to a user 102. The computing environment 100 includes a server system 128 that includes one or more server computing devices, one or more client computing devices 104, and one or more data sources 118a-n (collectively 118) communicatively connected via a network 130 or combination of networks. As will be appreciated, any number and/or type of server systems 128, client computing devices 104 and/or data sources 118 may be included in the computing environment 100 and those illustrated in FIG. 1 are only exemplary. Likewise, any number of users 102 may be included in the computing environment 100. As used herein, the term "user" will be used to refer to an individual interacting with the server system 128, client computing device 104, or the relevant POI discovery feed system 106.

The client computing device 104 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device). The server system 128 is operative to exchange data and information, including information about the user 102, action commands, POI related information, and other like information with the client computing device 104. For example, the relevant POI discovery feed system 106 interacts via the server system 128 to receive user-selections, user input, and action instructions, and to generate a discovery feed 132 of content feed items related to POIs relevant to the user 102. The hardware of these computing devices is discussed in greater detail in regard to FIGS. 8, 9A, 9B, and 10.

In some examples, the client computing device 104 comprises a client or mobile application that operates as a user agent executing locally on the computing device and accesses the Relevant POI discovery feed system 106 via a network 130 or a plurality of networks. The user 102 is enabled to interact with the Relevant POI discovery feed system 106 via the client device 104 to provide topic of interest selections and other signals, discover and view POI content feed items including content elements such as articles or stories, pictures, maps, links to related content, and/or to add feedback in association with a POI.

The relevant POI discovery feed system 106 comprises various components for generating an interactive discovery feed 132 of POI content feed items relevant to users 102. According to an aspect, the Relevant POI discovery feed system 106 includes a content mining engine 108 illustrative of a software module, system, or device operative to curate POI-related content 116 from a one ore a plurality of data sources 118. In some examples, the content mining engine 108 is integrated with the server system 128. In other examples, the content mining engine 108 is otherwise communicatively coupled with the server system 128. For example, the content mining engine 108 may be located at a remote computing resource and communicatively coupled with the server system 128. The one or more data sources 118 can include various types of data sources, such as websites on the World Wide Web, social networking data sources, and other data sources. In some examples, the one or more data sources 118 include Web resources that are crawled and indexed by a search engine.

In some examples, the content mining engine 108 is operative to parse the contents of a data source 118 for identifying articles or narratives related to POIs, such as national or state parks, museums, hiking trails, historic landmarks, tourist attractions, and the like. POI-related content 116, such as articles or narratives may include images, maps, links, or other content elements. In some examples, the content mining engine 108 parses the contents of a data source 118 for POI-related content 116 comprising particular key words or for content responsive to one or more rules. In other examples, the content mining engine 108 reads underlying the HTML (HyperText Markup Language) structure of an HTML source for metadata, particular key words, or for POI-related content that satisfies to one or more rules.

According to an aspect, the relevant POI discovery feed system 106 further comprises an extraction engine 110 illustrative of a software module, system, or device operative to analyze a POI-related content 116, and identify, extract, and tag particular content elements, such as topics, images, maps, links, etc. For example, a POI-related content item 116 may be a narrative (e.g., an article or a story) about the Great Smoky Mountains National Park that includes various pictures, maps, etc. Consider, for example, that the narrative is about the impressive fall colors in the Smoky Mountains due to substantially diverse species of majorly deciduous native trees and about popular driving routes for viewing the fall colors. Accordingly, when evaluating the narrative and extracting particular content elements, the extraction engine 110 is operative to identify and extract the photos, location information, maps, and various topics, such as: Smoky Mountains, national park, foliage, landscape, fall recreation, family activities, driving, hiking, etc.

In some examples, the extraction engine 110 performs machine learning techniques on the POI-related content 116 for detecting one or more topics. In one example, natural language processing (NLP) is used to extract a list of strings denoting topics being analyzed. In another example, keywords, topics, categories, and entities can be extracted. In another example, topics for a collection of data are detected, wherein a topic may be identified with a key phrase, which can be one or more related words. According to an aspect, the extraction engine 110 tags extracted POI content elements and then aggregates the tagged elements into a standardized POI content feed item, such as a card, according to a schema. The extraction engine 110 is operative to store the collected and extracted POI-related content 116 in a POI data store 120 integrated or otherwise communicatively coupled with the server system 128.

The POI data store 120 may include lists, arrays, databases, and other data structures used to provide storage and retrieval of data. For example, the POI data store 120 is a data store of POI-related narratives that are tagged with identified metadata, such as topics, location, season, etc. In examples, the POI data store 120 is generated offline and continually updated with POI-related content 116 mined from a plurality of data sources 118. In some examples, the extraction engine 110 is further operative to evaluate collected POI-related content 116 for cleaning data and removing outliers.

According to an aspect, the relevant POI discovery feed system 106 further comprises a user interface (UI) engine 114 illustrative of a software module, system, or device operative to generate a graphical UI (GUI) 126 for enabling the user 102 to interact with the relevant POI discovery feed system 106. In one example, the GUI 126 is configured to display a plurality of topics from which the user 102 is prompted to select topics of interest to the user, and to receive the selections of topics of interest made by the user. In some examples, the display of topics and the receiving of user-selected topics of interest are part of an initial set-up process with the relevant POI discovery feed system 106. The user-selected topics of interest are stored in a user preferences data store 122. While the disclosure describes multiple data stores (i.e., POI data store 120 and user preferences data store 122), in various examples, the data stores may be configured as a single data store or multiple data stores.

According to an aspect, the relevant POI discovery feed system 106 further comprises a relevance engine 112 illustrative of a software module, system, or device operative to determine POIs that are likely to be of interest to the user 102 and to select POI-related content 116 to include in a personalized feed for the user 102 based in part on the user's selected interests. In some examples, POI-related content 116 selected for inclusion in a feed are selected based in part on popularity or ratings of content items. Further, as the user 102 interacts with the relevant POI discovery feed system 106, the interactions and user inputs are utilized as signals by the relevance engine 112 to further define the user's interests and preferences for personalized content feeds. In some examples, in determining a set of POI-related content 116 to include in a personalized content feed, the relevance engine 112 is operative to contextualize the feed by selecting POI-related content 116 that is contextually relevant to the user based on one or more contextual conditions, such as distance, destination, time of year, demographic profile data, and the like.

According to an aspect, the POI-related content 116 selected for inclusion in a personalized discovery feed 132 is selected for the user 102 for surfacing POIs that the user may not be aware of. Thus, aspects of the relevant POI discovery feed system 106 performs as a POI discovery service. That is, and as will be described in further detail below, the user 102 is enabled to select his/her interests and, in some examples, a particular or general location. However, the POIs surfaced to the user 102 in the personalized discovery feed 132 are not user-selected; they are selected for the user by aspects of the relevant POI discovery feed system 106.

The UI engine 114 is further operative to generate a GUI 126 including an interactive discovery feed 132 for display to the user 102, wherein the discovery feed comprises a set of POI content feed items related to POIs determined to be relevant to the user 102 by the relevance engine 112. According to an example, a POI content feed item includes a narrative about a particular POI, and can include additional content elements, such as images, maps, links, etc. In some examples, the discovery feed 132 is a card-based interface, where each POI content feed item is displayed on an individual card. Accordingly, the user 102 is enabled to efficiently navigate through (e.g., via swiping or clicking though) POI content feed items and to view information associated with one particular POI at a time. Thus, aspects of the relevant POI discovery feed system 106 provide a readable UI that does not overload the user with extraneous information.

In some examples, the discovery feed 132 is presented differently based on the client computing device 104 used to access the relevant POI discovery feed system 106. For example, if the client computing device 104 is a mobile device with limited display space and/or capabilities, the discovery feed 132 may be displayed in a particular format that is optimized for small form factor devices. According to an aspect, the user 102 is enabled to select a particular POI content feed item, for example, to read a POI-related narrative, view photos or maps, or to interact with the item, such as by saving the item, marking the item as being associated with a POI previously visited by the user, adding comments to the narrative, or exploring other related POIs.

In some examples, the GUI 126 includes a search function that allows the user 102 to discover POIs responsive to search criteria and based on relevance to the user. For example, the user 102 may enter a location or destination (e.g., a city, a country, a region), and one or more POI content feed items related to POIs at or near the location or destination are presented in a discovery feed 132 for display to the user. According to an aspect, the one or more POI-related content items 116 are selected based in part on the user's interests (e.g., topics of interest selected by the user 102). According to one example, the one or more POI-related content items 116 are selected based in part on popularity (e.g., determined by user-provided ratings).

In some examples, the discovery feed 132 or functionalities provided by the relevant POI discovery feed system 106 are invoked through different actions depending on the client computing device 104 capabilities. For example, if the computing device includes a touch-based display, functionalities may be invoked through touch-based actions. If the client computing device 104 does not include a touch-based display, the functionalities may be invoked through use of another input component (e.g., mouse, keyboard). For example, the client computing device 104 is operative to receive input from the user 102, such as text input, inking input, selection input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence.

In some examples, the relevant POI discovery feed system 106 further includes an itinerary engine 134 illustrative of a software module, system, or device operative to provide an itinerary building service. For example, the itinerary engine 134 is operative to build an itinerary for the user 102 based on one or more saved POIs. In one example, POIs included in an itinerary are within a predetermined or user-selected perimeter.

Figure 2B:
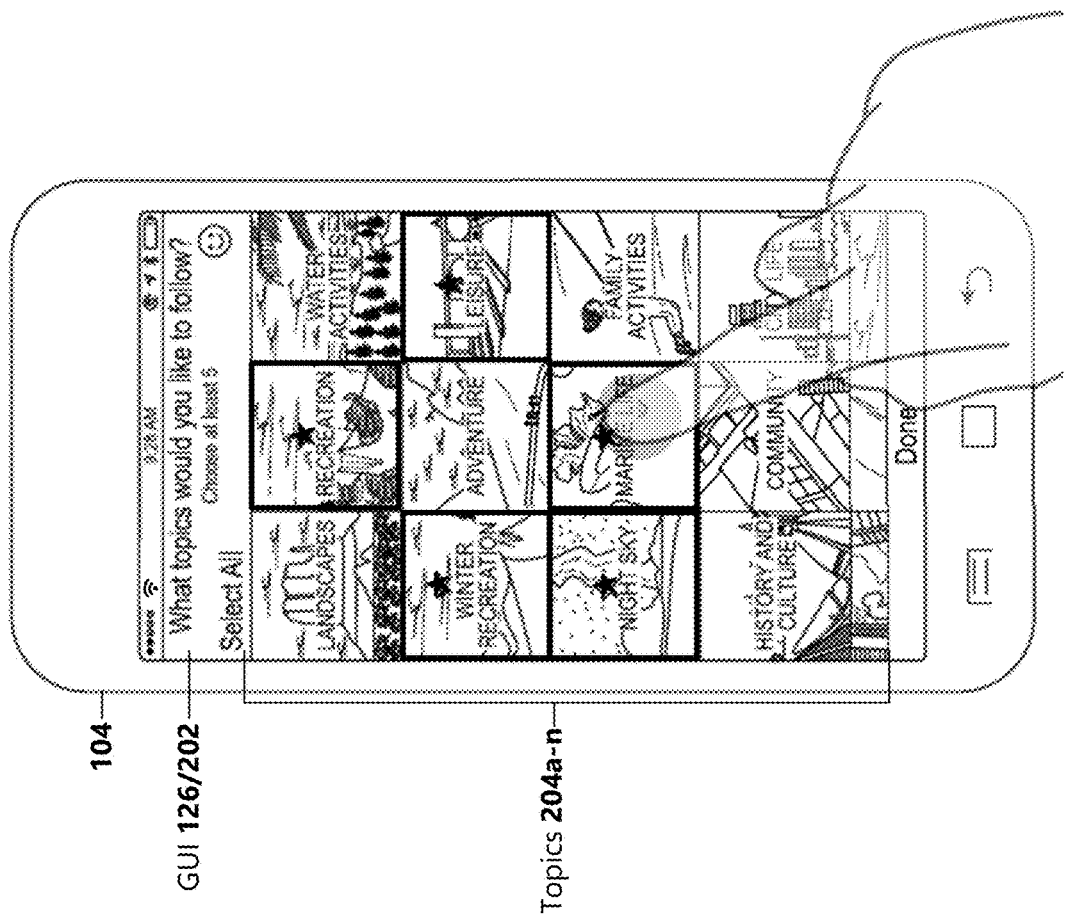
FIGS. 2A-B illustrate example user interfaces generated by aspects of the relevant POI discovery feed system where a user is enabled to explicitly select topics that are of interest to the user.
Figure 2A:
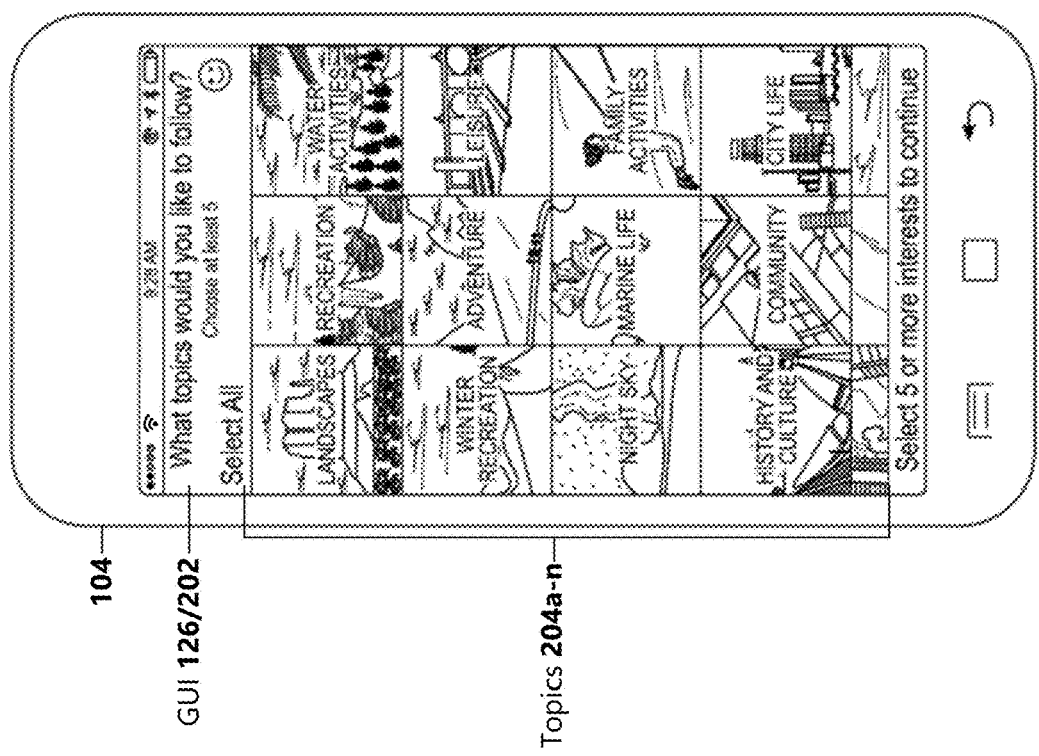

Having described an example operating environment 100 and components of the relevant POI discovery feed system 106, FIGS. 2A-B, 3A-E, 4A-F, and 5A-C illustrate example user interfaces generated by aspects of the relevant POI discovery feed system 106 where a user is enabled to select topics of interest. With reference now to FIGS. 2A-B, an example GUI 126/202 is shown displayed on a mobile client computing device 104 that includes a plurality of topics 204a-n (collectively 204) with which various POIs are associated. According to an aspect and as illustrated, the user 102 is prompted to select topics 204 that are of interest to the user. In some examples, the user 102 is prompted to select at least a predetermined minimum number of topics 204 of interest (e.g., 3 topics, 5 topics, 10 topics). According to an aspect, the selected topics 204 of interest are stored in the user preferences data store 122, and are utilized by the relevance engine 112 to identify the user's interests for selecting content relevant to the user 102.

FIGS. 3A-E illustrate example GUIs 126/302 generated by aspects of the relevant POI discovery feed system 106 including an example interactive discovery feed 132 comprising a plurality of POI content feed items 300. For example and with reference to FIG. 3A, the example interactive discovery feed 132 is displayed in a card-based UI, where each POI selected by the relevance engine 112 for inclusion in the feed is displayed on an individual card 304a-n (collectively 304). In one example, each card 304 or POI content feed item 300 includes a narrative 306 associated with a particular POI 310 mined from a data source 118. According to an example and as illustrated, the data source 118 that the particular narrative 306 is mined from is included as a link 308 in the POI content feed item 300. According to an aspect, each POI content feed item 300 or card 304 in the discovery feed 132 includes at least one photo or image 312 of the POI 310. In one example and as will be described in further detail below, a save option 314 is provided for enabling the user 102 to save POI-related content items 116 associated with locations that the user is interested in exploring further or possibly visiting.

In another example and also as will be described in further detail below, a "been there" option 316 is provided for enabling the user 102 to provide feedback to the relevant POI discovery feed system 106 about types of places that the user has visited in the past. For instance, when a user 102 selects the "been there" option 316 for a particular POI 310, metadata associated with the POI is identified and stored in the user preferences data store 122 for identifying user interests or other user preference data. Further, when the user 102 selects the "been there" option 316 for a particular POI 310, the relevance engine 112 is operative to exclude the particular POI from future discovery feeds 132.

Figure 3B:
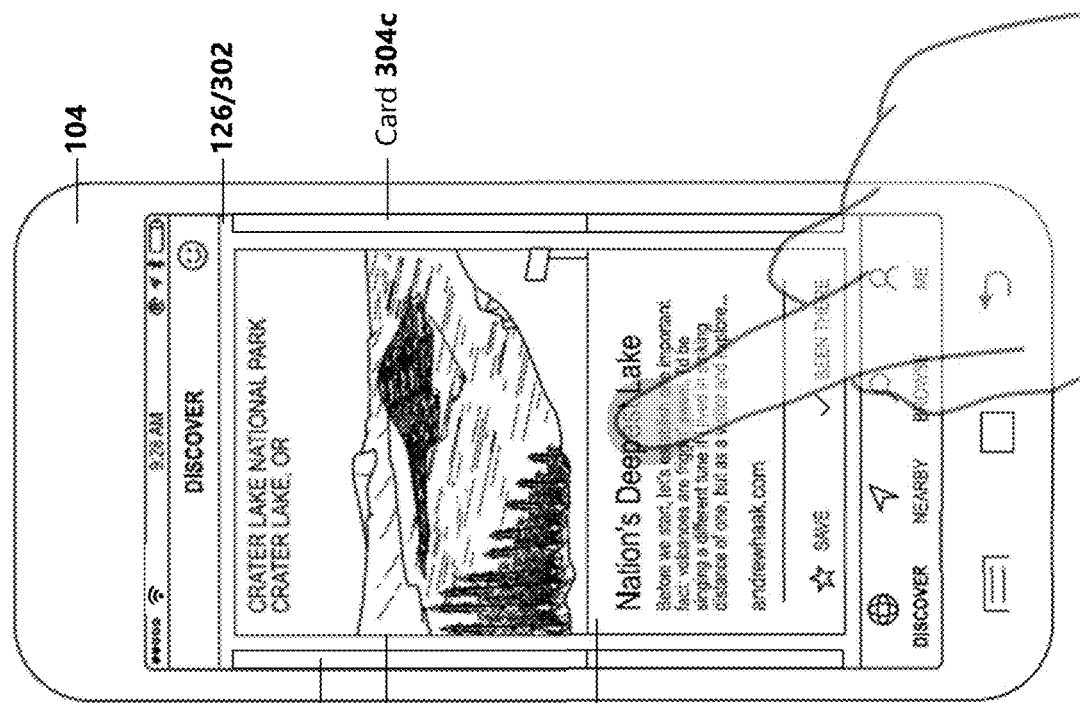
Figure 3A:
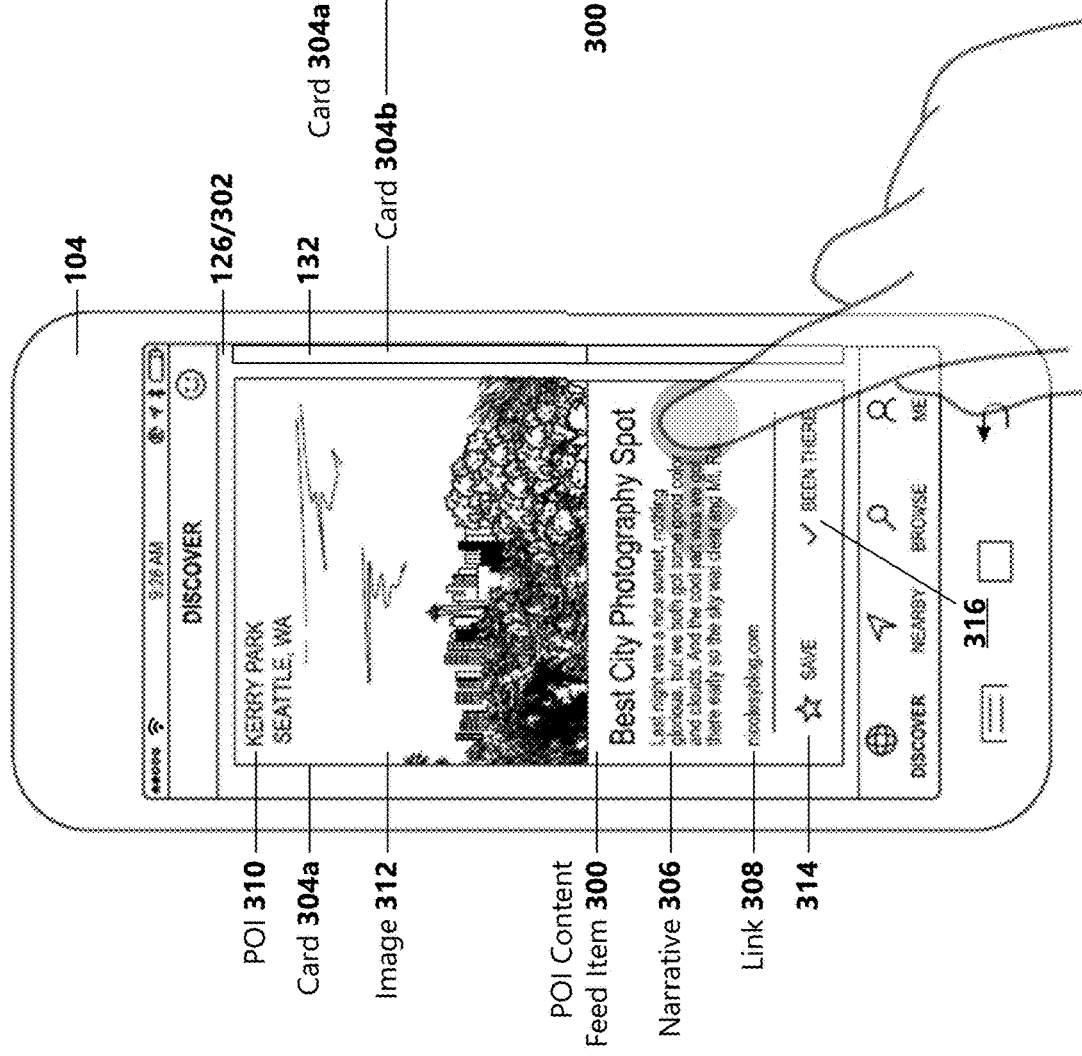
Figure 3E:
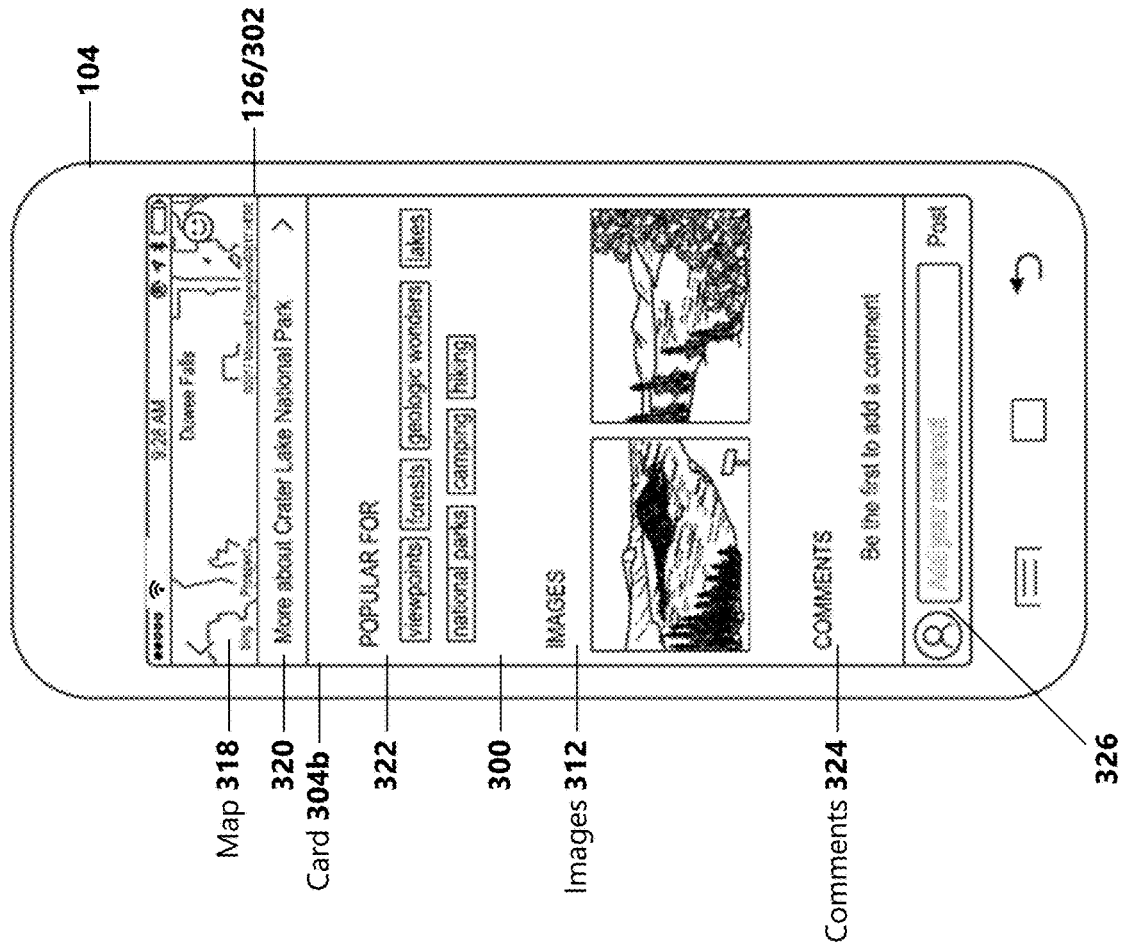

As illustrated, the user 102 is enabled to swipe through, click through, or otherwise navigate through displayed cards 304. As illustrated in FIG. 3B, the user is further enabled to select a card 304 for opening the POI content feed item 300 and displaying additional information about the particular POI 310. For example, in FIG. 3B, the user 102 selects the card 304b centrally displayed in the example GUI 126/302.

With reference now to FIG. 3C, responsive to the selection, the selected POI content feed item 300 is opened or expanded in the GUI 126/302, and additional information about the associated POI 310 is provided. For example, the selected and expanded POI content feed item 300 includes various content items, such as a narrative 306 or article about the POI 310, a data source link 308, a map 318, and one or more images 312. In examples, the user 102 is enabled to scroll or navigate the POI content feed item 300 to view additional information that may not fit in the initially GUI 302 when the expanded item is initially displayed. For example and with reference now to FIGS. 3D and 3E, additional information can include a map 318, a link 320 to additional content about the POI 310, selectable related metadata 322 extracted from the narrative 306 or description of the POI-related content item 116, additional images 312, comments 324 provided by other users, etc. According to an example, a comment field 326 is provided for enabling the user 102 to provide a comment 324 about the POI 310 or the content included in the POI content feed item 300.

Figure 4D:
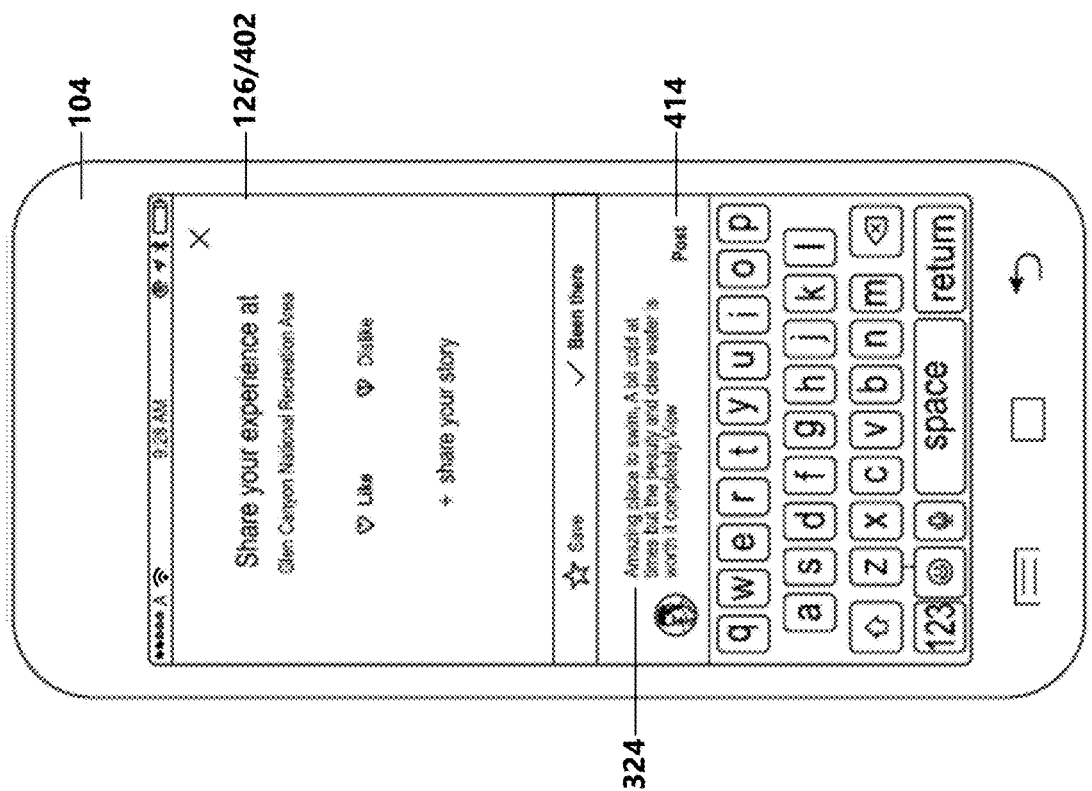

FIGS. 4A-F illustrate example GUIs 126/402 generated by aspects of the relevant POI discovery feed system 106 where a user is enabled to provide user feedback related to a POI 310. As illustrated in FIG. 4A, the user 102 is enabled to select the "been there" option 316 to provide a signal to the relevant POI discovery feed system 106 about types of places that the user has an interest in based on past experiences. Further, selection of the "been there" option 316 provides a signal to the relevant POI discovery feed system 106 to exclude the particular POI 310 from future discovery feeds 132. According to an example and with reference now to FIG. 4B, various options are displayed in the GUI 126/402 for enabling the user 102 to provide feedback associated with the POI 310, such as a like option 404, a dislike option 406, and a "share your story" option 408. As should be appreciated, inclusion of other options is possible and is within the scope of the present disclosure. In one example, selection of the like option 404 increments a rating score of the POI 310, and a selection of the dislike option 406 decrements the rating score of the POI 310. Additionally or alternatively, selection of the like option 404 or the dislike option 406 provides a signal to the relevant POI discovery feed system 106 regarding the user's interests and preferences, and is stored in the user preferences data store 122.

Figure 4C:
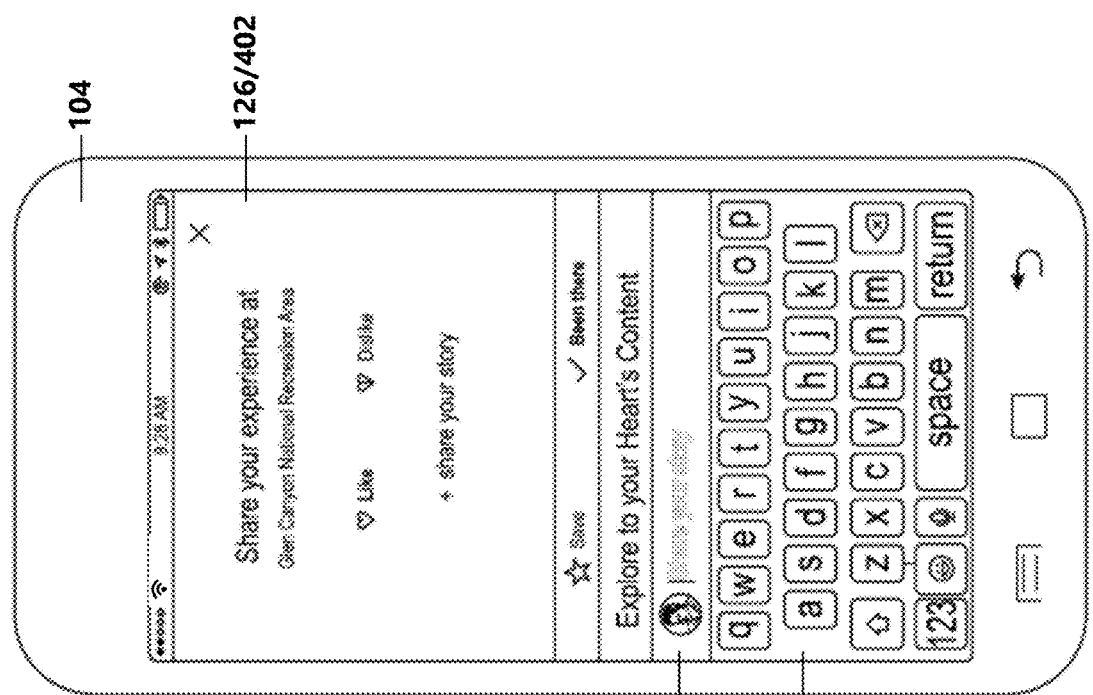

In the example illustrated in FIG. 4B, the user 102 selects the "share your story" option 408. In response and as illustrated in FIGS. 4C and 4D, an input field 410 is provided in the GUI 126/402 for enabling the user 102 to input a comment 324. In some examples, such as when the client computing device 104 includes a touch-based display, an onscreen keyboard 412 is displayed in the GUI 126/402 for enabling keyboard input of a comment 324. According to an example, after inputting a comment 324, a post option 414 is provided for enabling the user 102 to post the comment 324 to the POI content feed item 300 for display to other users. In some examples and as illustrated in FIGS. 4E and 4F, a post confirmation 416 is temporarily displayed in the GUI 126/402 that informs the user 102 when the comment 324 is uploaded or posted.

Figure 5C:
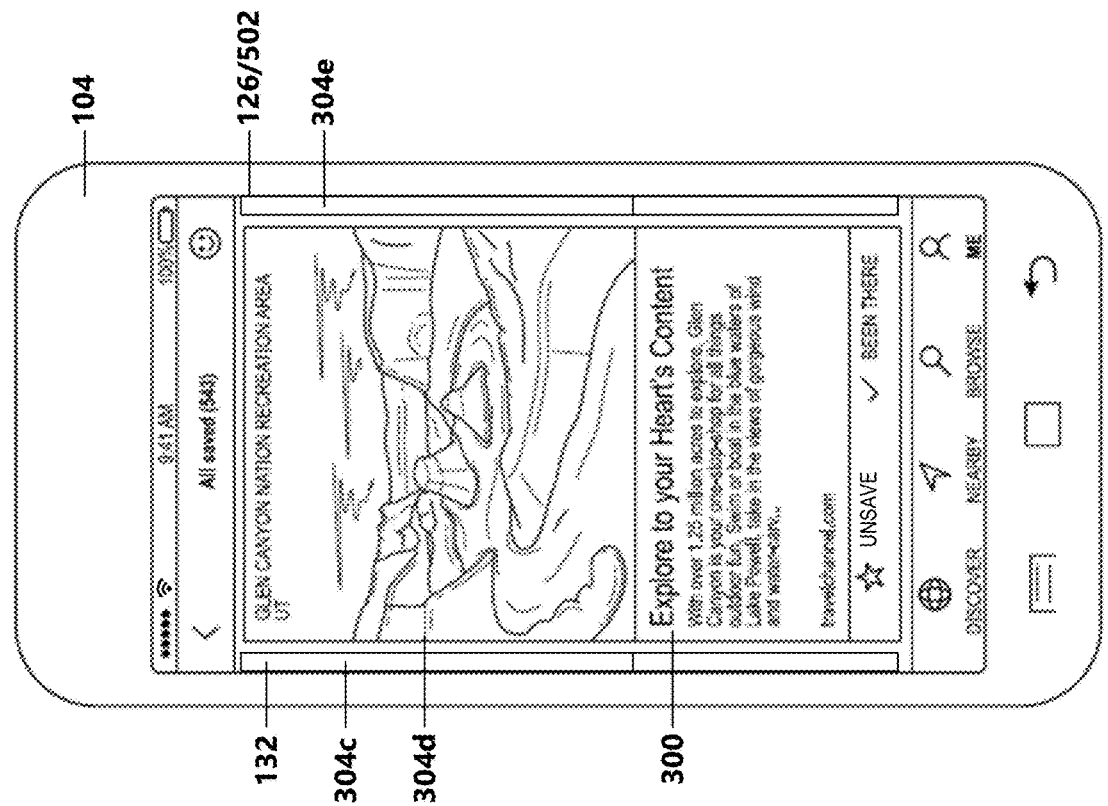

FIGS. 5A-C illustrate example GUIs 126/502 generated by aspects of the relevant POI discovery feed system 106 where POIs 310 are categorized in the GUI based on user interaction or topics of interest selected by the user. According to an example and with reference now to FIG. 5A, the example GUI 126/502 includes one or more of a "saved" grouping 504, a "been there" grouping 506, and a "my topics" grouping 508. As should be appreciated, inclusion of other groupings is possible and is within the scope of the present disclosure. In one example, when the user 102 selectively saves a POI 310 or a POI content feed item 300 (e.g., via a selection of the save option 314 illustrated in FIG. 3A), the POI or POI content feed item is categorized as a saved item and can be accessed in the "saved" grouping 504.

According to an example, when the user 102 selects the "been there" option 316 for a POI 310 (e.g., as illustrated in FIG. 4A), the POI or POI content feed item 300 is categorized as a "been there" item and can be accessed in the "been there" grouping 506. When the user 102 selects a topic 204 or when a topic of interest is implicitly selected for the user based on the user's interactions with the relevant POI discovery feed system 106, the topic is categorized as a topic of interest for the user 102. According to an example, the user 102 is enabled to view and managed topics of interest via a selection of the "my topics" grouping 508.

As illustrated in FIG. 5A, the user 102 selects the "saved" category 504, and in response to the selection and as illustrated in FIG. 5B, saved POIs 310 or cards 304 associated with saved POIs are provided in the GUI 126/502. In some examples, the saved POIs 310 or POI content feed item 300 associated with saved POIs are further categorized. In one example, saved items are further categorized by topic 204 (e.g., adventure, beaches, lakes). In another example, saved items are contextually categorized by location (e.g., POIs 310 that are located near to the user's current location as determined by a GPS, wireless access point signal location, or other location determining methods).

As illustrated in FIG. 5B, the user 102 makes a selection of an "all saved" sub-grouping 510. Responsive to the selection and as illustrated in FIG. 5C, the GUI 502 is updated to display saved POIs 310 or POI content feed items 300 associated with saved POIs in a feed, such as the discovery feed 132. According to an example, the user 102 is enabled to navigate through the various saved POIs.

Figure 6:
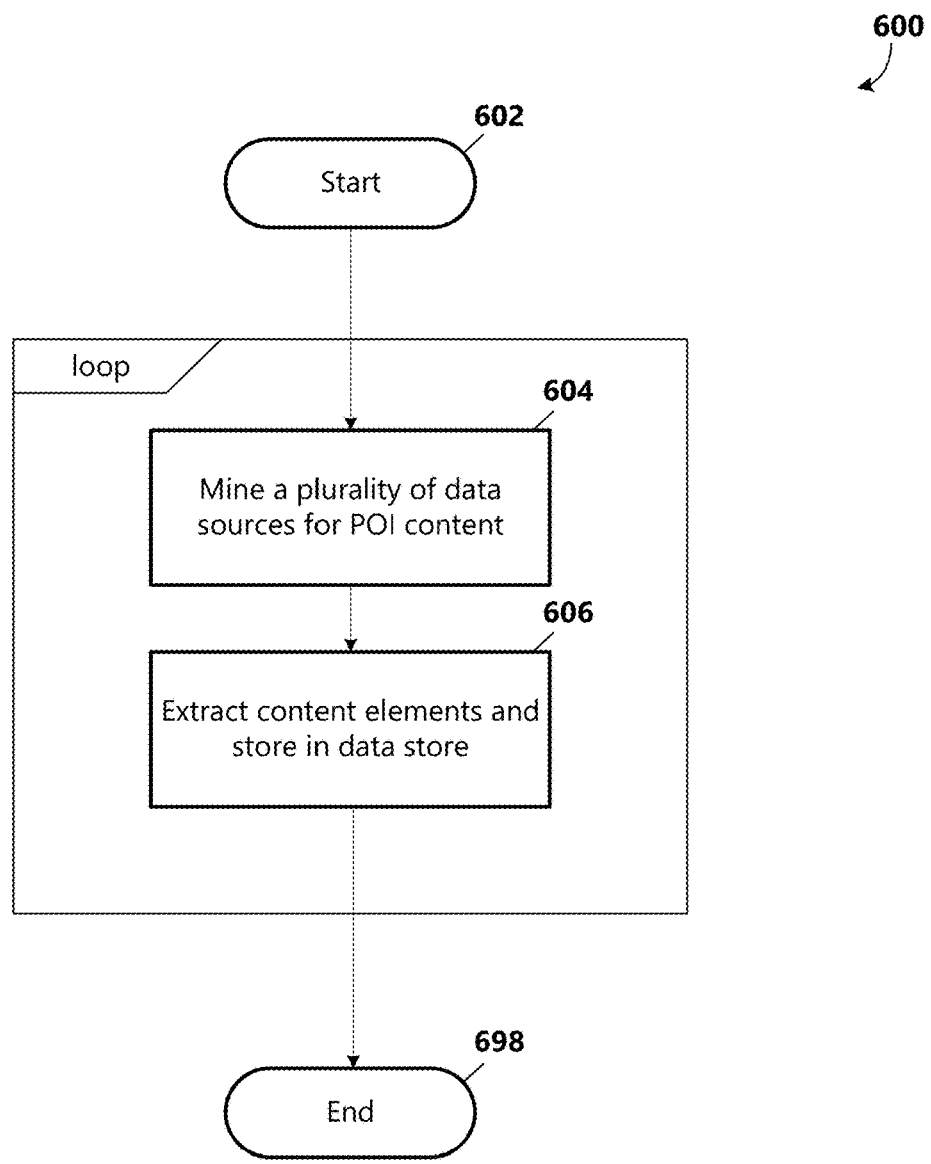
FIG. 6 is a flowchart showing general stages involved in an example method for generating a database of POI content feed items.

FIG. 6 is a flow chart showing general stages involved in an example method 600 for generating a POI data store 120. With reference now to FIG. 6, the method 600 begins at START OPERATION 602, and proceeds to OPERATION 604, where the content mining engine 108 mines a plurality of data sources 118 for POI-related content 116, such as narratives, articles, stories, and the like.

The method 600 proceeds to OPERATION 606, where the POI-related content 116 is parsed for identifying POIs 310, topics 204 and data elements such as images 312, maps 318, links 308, metadata 322, and other data elements. In some examples, the content mining engine 108 utilizes machine learning techniques for identifying POIs 310, topics 204, and data elements. According to an aspect, a relatedness score of a topic 204 for a POI 310 is calculated and stored in the POI data store 120. In some aspects, POI data elements are tagged and organized in a POI content feed item 300 according to a schema. According to an aspect, mining of data sources 118 for POI-related content 116 and updating the POI data store 120 is an offline and continual process. The method 600 ends at OPERATION 698.

Figure 7:
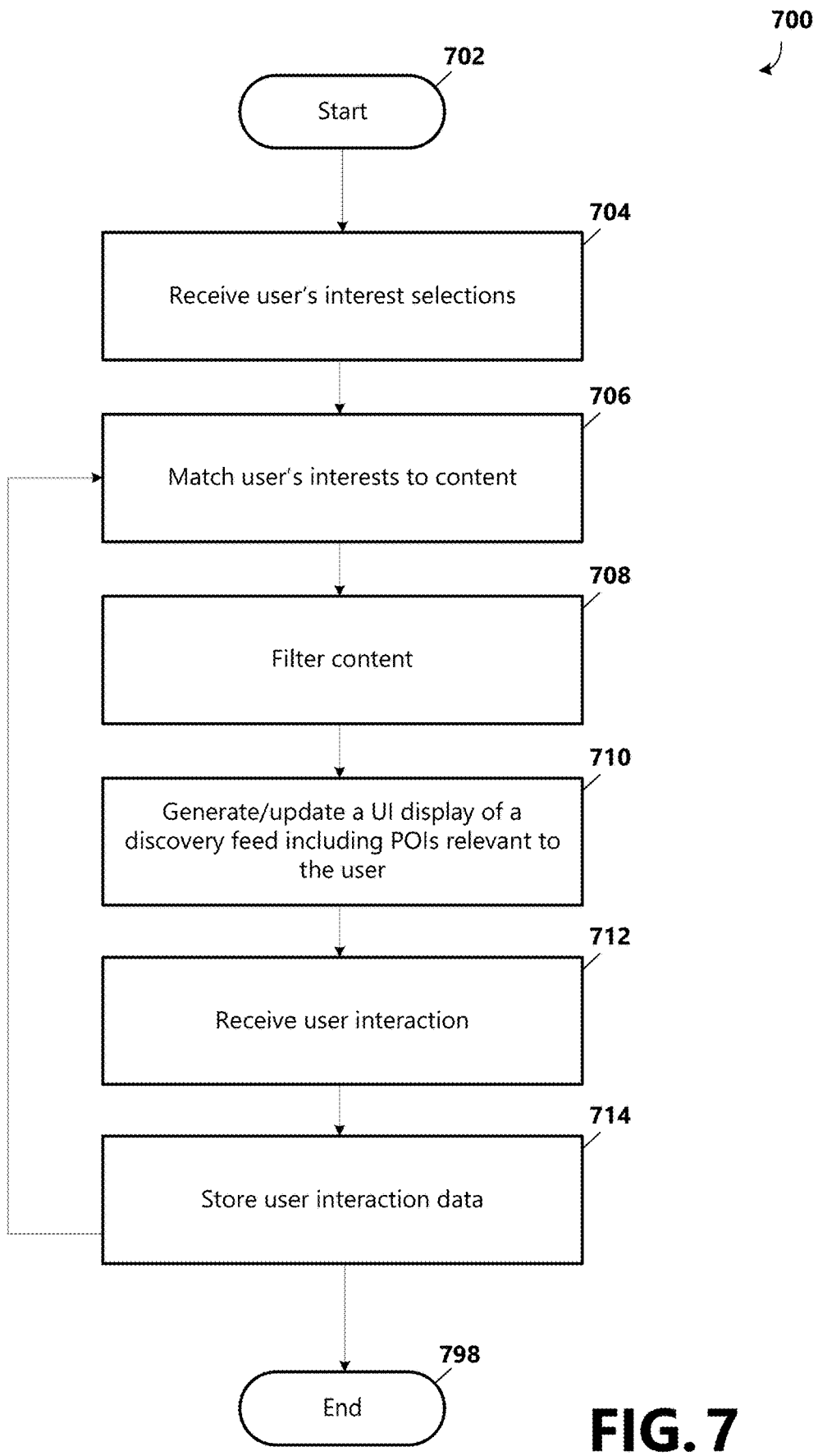
FIG. 7 is a flowchart showing general stages involved in an example method for generating an interactive discovery feed of POI content feed items relevant to a user.

FIG. 7 is a flow chart showing general stages involved in an example method 700 for generating an interactive discovery feed 132 of POI content feed items 300 relevant to a user 102. With reference now to FIG. 7, the method 700 begins at START OPERATION 702, and proceeds to OPERATION 704, where a user 102 opens an application that is operative or configured to communicate with the Relevant POI discovery feed system 106, and selects topics 204 that are of interest to him/her. For example, a plurality of topics 204 are displayed to the user 102, and the user is prompted to select topics that are of interest to him/her. In some examples, a predetermined minimum number of topics are stipulated to be selected. At OPERATION 704, the user-selected topics 204 of interest are received and stored.

The method 700 proceeds to OPERATION 706, where POI content 116 is analyzed for determining a match between the user's interests and POIs to include in a discovery feed 132. For example, if the user's interests include history and culture based on a user-selected topic 204, a match between the user's interests and a particular museum may be determined. In one example, matches are determined based on a relatedness score. According to an aspect, a plurality of POIs 310 or POI content feed items 300 determined to be relevant to the user 102 based on the user's interests are selected for inclusion in the discovery feed 132.

The method 700 proceeds to OPERATION 708, where one or more POIs 310 or POI content feed items 300 are filtered out or one or more items are promoted based on contextual data. For example, a particular POI content feed item 300 may be filtered out based on low ratings. In another example, a particular POI content feed item 300 may be included in the discovery feed 132 based on location or season.

The method 700 continues to OPERATION 710, where a GUI 126 including an interactive discovery feed 132 is generated for display to the user 102, wherein the discovery feed comprises a set of POI content feed items 300 related to POIs determined to be relevant to the user 102 by the relevance engine 112. According to an example, each POI content feed item 300 includes a narrative 306 about a particular POI 310, and can include additional content elements, such as images 312, maps 318, links 308, etc. In some examples, the discovery feed 132 is a card-based interface, where each POI content feed item 300 is displayed on an individual card 304.

At OPERATION 712, the user 102 interacts with the discovery feed 132, and user interaction data is received by the relevant POI discovery feed system 106. For example, in addition to navigating through POI content feed items 300 in the discovery feed 132, the user 102 may like a POI 310, dislike a POI, save a POI, mark a POI as a previously-visited POI, post a comment 324 about a POI, and the like.

The method 700 continues to OPERATION 714, where the user interaction data is stored. The method 700 then returns to OPERATION 708, where the user interaction data is utilized to determine implicit user interests, and to modify the user's preferences and interests. Accordingly, future discovery feeds 132 generated and provided to the user 102 are further personalized based on the user's interests and the signals he/she provides to the system. The method 700 ends at OPERATION 798.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
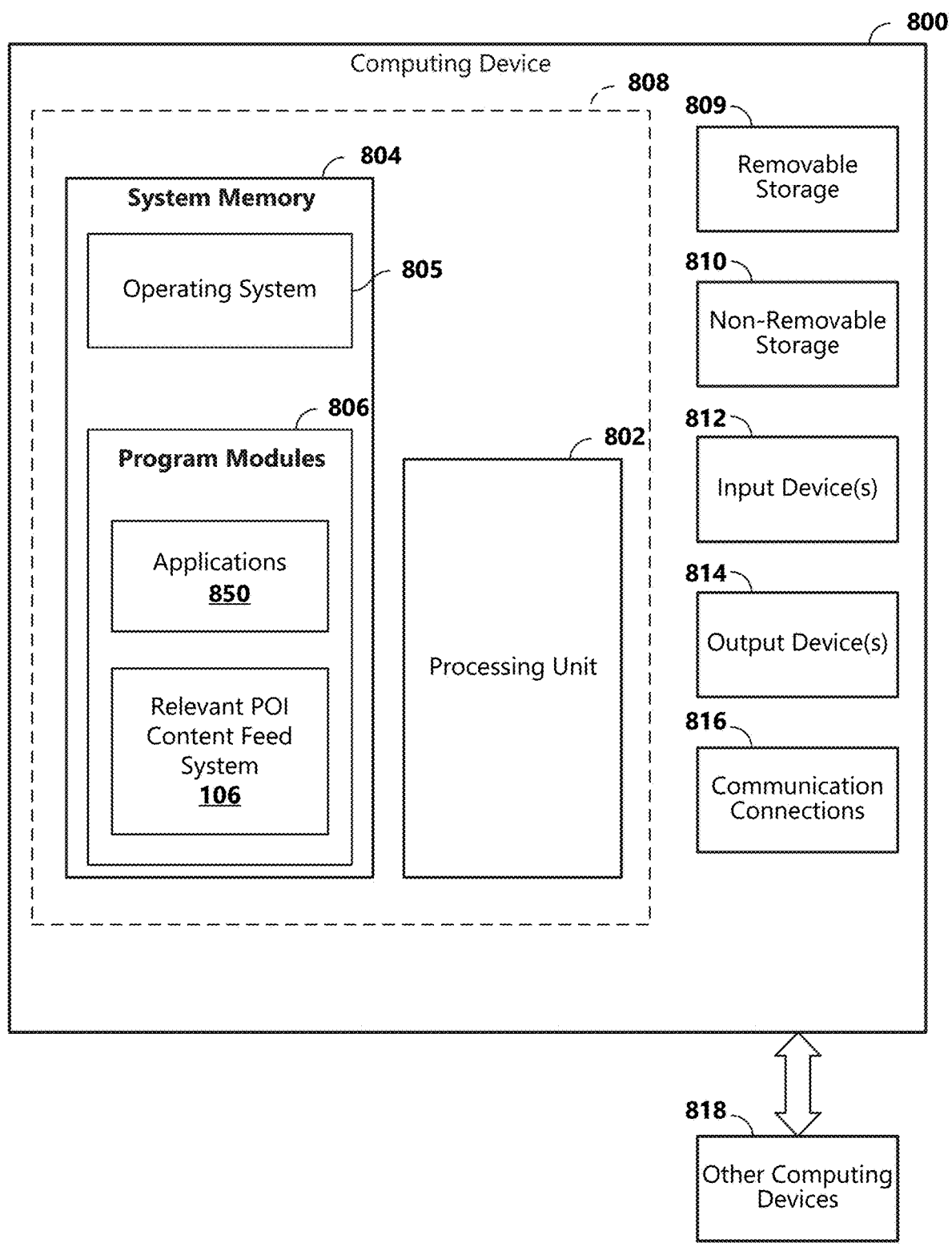
FIG. 8 is a block diagram illustrating physical components of a computing device with which examples may be practiced.
Figure 9A:
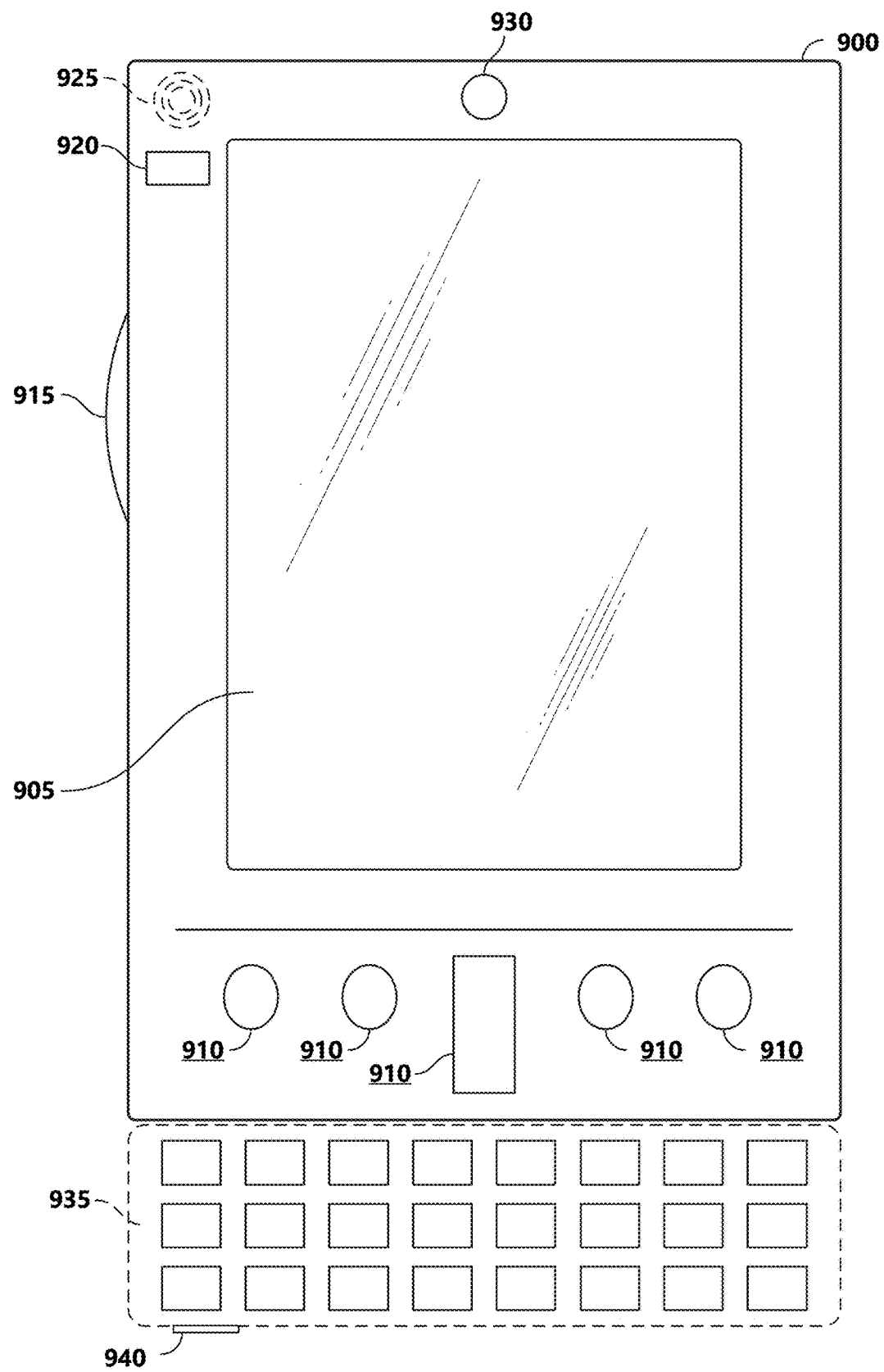
FIGS. 9A and 9B are block diagrams of a mobile computing device with which aspects may be practiced.
Figure 9B:
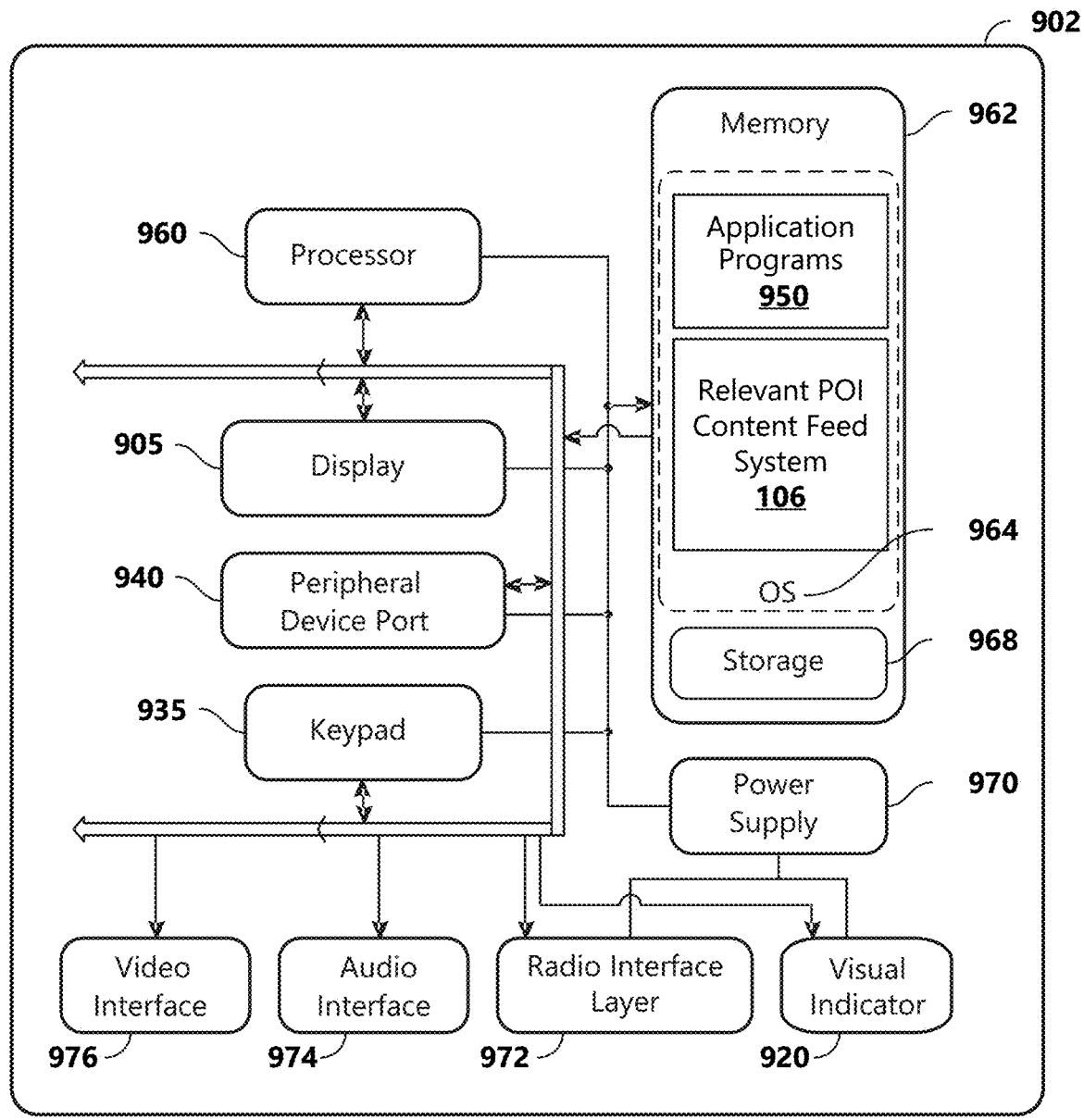
Figure 10:
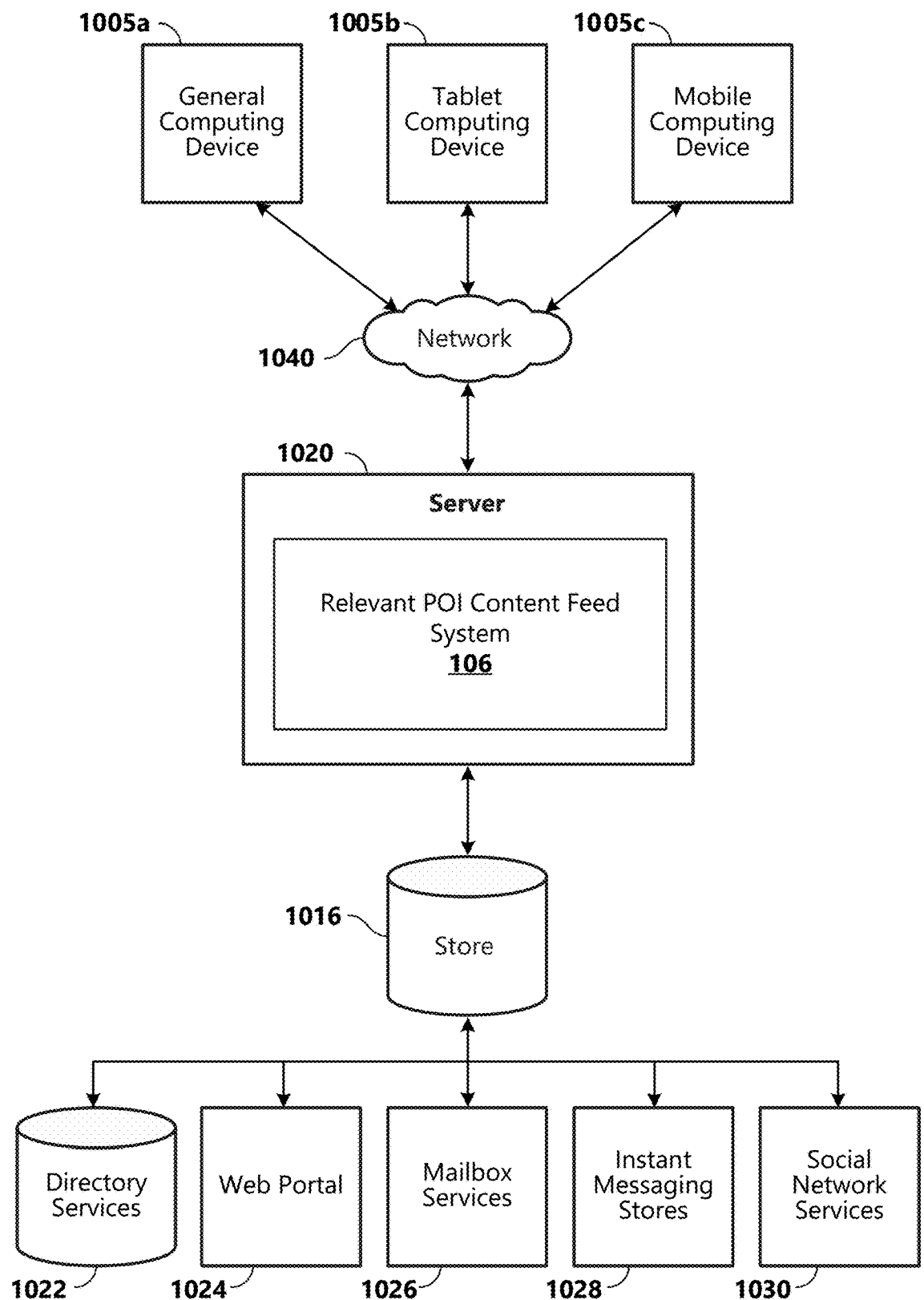
FIG. 10 is a block diagram of a distributed computing system in which aspects may be practiced.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure are be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the relevant POI discovery feed system 106. The operating system 805, for example, is suitable for controlling the operation of the computing device 800. Furthermore, aspects are practiced in conjunction with a graphics library, other operating systems, or any other application program, and is not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., relevant POI discovery feed system 106) perform processes including, but not limited to, one or more of the stages of the method 600 illustrated in FIG. 6 and method 700 illustrated in FIG. 7. According to an aspect, other program modules are used in accordance with examples and include applications such as electronic mail and contacts applications, word processing applications, spreadsheet applications, database applications, slide presentation applications, drawing or computer-aided drafting application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the relevant POI discovery feed system 106 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system for generating an interactive discovery feed 132 of place of interest items relevant to a user 102, as described above. Content developed, interacted with, or edited in association with the relevant POI discovery feed system 106 is enabled to be stored in different communication channels or other storage types. For example, various documents may be stored using a directory service 1022, a web portal 1024, a mailbox service 1026, an instant messaging store 1028, or a social networking site 1030. The relevant POI discovery feed system 106 is operative to use any of these types of systems or the like for generating an interactive discovery feed 132, as described herein. According to an aspect, a server 1020 provides the relevant POI discovery feed system 106 to clients 1005a,b,c. As one example, the server 1020 is a web server providing the relevant POI discovery feed system 106 over the web. The server 1020 provides the relevant POI discovery feed system 106 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for generating a topic-based place of interest discovery feed for a user, comprising:
    receiving topics of interest selected by a user;
    mining a places of interest data store for places of interest content items matching the selected topics of interest, wherein the places of interest data store includes locations for the places of interest;
    generating a discovery feed, the discovery feed including place of interest content items determined to be relevant to a user based on a particular location;
    providing the generated discovery feed to a user interface for display to the user, wherein the user interface includes:
        a selectable like option for each displayed place of interest content item that enables the user to indicate an interest in a displayed place of interest content item; and
        a selectable dislike option for each displayed place of interest content item that enables the user to indicate a dislike of a displayed place of interest content item; and
    updating a user preference data store with the like and dislike user selections associated with each displayed place of interest content item.

2. The method of claim 1, wherein receiving selected topics of interest further comprises:
    presenting a search function to the user to allow the user to discover places of interest relevant to the user.

3. The method of claim 1, wherein providing the generated discovery feed to the user interface further comprises providing a selectable been there option for each displayed place of interest content item that enables the user to indicate that the user has visited the place of interest associated with the displayed place of interest content item.

4. The method of claim 3, further comprising:
    responsive to receiving a selection of the been there option, categorizing the displayed place of interest content item as a place that the user has visited; and
    excluding the displayed place of interest content item in future generated discovery feeds for the user.

5. The method of claim 3, further comprising: responsive to receiving a selection of the been there option, providing an input field to the user interface for enabling the user to input a comment for a displayed place of interest content item.

6. The method of claim 1, wherein providing the generated discovery feed to the user interface further comprises providing a selectable save option for each displayed place of interest content item.

7. The method of claim 6, further comprising:
    receiving a selection of the save option for a displayed place of interest content item; and
    updating the user preference data store with one or more topics of interest associated with the saved place of interest content item.

8. The method of claim 1, wherein providing the generated discovery feed to the user interface for display to the user further comprises displaying each of the place of interest content items to a card in a card-based user interface.

9. The method of claim 1, wherein each place of interest content item comprises at least one of:
    a narrative about the place of interest content item;
    an image of the place of interest content item;
    a map showing a location of the place of interest content item;
    a link to a data source from where a narrative content item related to the place of interest content item was collected; and
    topics associated with the place of interest content item.

10. A system for generating a topic-based place of interest discovery feed for a user, comprising:
    a processing unit; and
    a memory storing computer readable instructions, which when executed, cause the processing unit to:
        receive topics of interest selected by a user;
        mine a places of interest data store for places of interest content items matching the selected topics of interest, wherein the places of interest data store includes locations for the places of interest;

generate a discovery feed, the generated discovery feed including a plurality of place of interest content items determined to be relevant to the user based on a particular location;

provide the generated discovery feed to a user interface for display to the user, wherein the user interface includes one or more of:

a selectable like option for each displayed place of interest content item that enables the user to indicate an interest in a displayed place of interest content item; and a selectable dislike option for each displayed place of interest content item that enables the user to indicate a dislike of a displayed place of interest content item; and update a user preference data store with the like and dislike user selections associated with each displayed place of interest content item.

11. The system of claim 10, wherein:
the user interface is a card-based user interface; and
each of the plurality of place of interest content items is displayed on an individual card.

12. The system of claim 10, wherein each the plurality of place of interest content items comprises at least one of:
a narrative about the place of interest content item;
an image of the place of interest content item;
a map showing a location of the place of interest content item;
a link to a data source from where a narrative content item related to the place of interest content item was collected; and
the topics of interest that match the place of interest content item.

13. The system of claim 10, further comprising:
mining a plurality of data stores for place of interest content items; and
storing found place of interest content items in the places of interest data store.

14. The system of claim 10, wherein mining the places of interest data store further comprises calculating a relatedness score of one or more topics of interest for a found place of interest content item.

15. The system of claim 10, wherein receiving selected topics of interest further comprises presenting a search function to the user allowing the user to discover places of interest relevant to the user.

16. The system of claim 10, wherein the user interface includes a selectable been there option for each displayed place of interest content item.

17. The system of claim 16, wherein the system is further operative to:
receive a selection of the been there option for a displayed place of interest content item;
categorize the displayed place of interest content item as a place that the user has visited; and
exclude the displayed place of interest content item in future generated discovery feeds for the user.

18. The system of claim 16, wherein the system is further operative to:
receive a selection of the been there option for a displayed place of interest content item; and
provide an input field in the user interface for enabling the user to input a comment for the displayed place of interest content item.

19. The system of claim 10, wherein the system is further operative to:
provide a selectable save option in the user interface for each displayed place of interest content item;
receive a selection of the save option for a displayed place of interest content item; and
update the user preference data store with one or more topics of interest associated with the saved place of interest content item.

20. A computer readable storage device storing computer readable instructions, which when executed, causes a processing unit to perform steps comprising:
generating a feed of a plurality of place of interest content items determined to be relevant to a user based in part on relatedness of one or more topics associated with each of the plurality of place of interest content items to one or more user selected topics of interest, wherein:
the one or more topics of interest are mined from a collection of narrative content items related to various places of interest; and
the feed comprises a plurality of place of interest content items determined to be relevant to the user based on a particular location;
providing the feed for display to a user interface, wherein the user interface includes one or more of:
a selectable like option for each displayed place of interest content item;
a selectable dislike option for each displayed place of interest content item;
a selectable been there option for each displayed place of interest content item, which when selected, causes the processing unit to:
categorize a displayed place of interest content item as a place that the user has visited;
provide an input field in the user interface for enabling the user to input a comment; and
exclude the displayed place of interest content item in future generated discovery feeds for the user; and
a selectable save option in the user interface for each displayed place of interest content item, which when selected, causes the processing unit to:
update a user preference data store with one or more topics of interest associated with a displayed place of interest content item.

* * * * *